3,494,899
USE OF 1,2-DITHIOLE-3-THIONE DERIVATIVES AS VULCANIZATION ACCELERATORS
Joseph P. Brown, Llangollen, Wales, assignor to Monsanto Chemicals Limited, London, England, a British company
No Drawing. Continuation-in-part of application Ser. No. 451,607, Apr. 28, 1965. This application May 10, 1968, Ser. No. 728,311
Claims priority, application Great Britain, May 5, 1964, 18,541/64; Nov. 11, 1964, 45,904/64; July 21, 1967, 33,729/67
Int. Cl. C08c 11/60
U.S. Cl. 260—79.5
11 Claims

ABSTRACT OF THE DISCLOSURE 5-mercapto-1,2,-dithiole-3-thiones are prepared by reacting sulfur with an olefin in the presence of an amine or an N-alkylated carboxylic amide. Alternately, a dithiole-3-thione is reacted with (a) sulfur or hydrogen sulfide in the presence of an amine or an N-alkylated carboxylic amide or (b) alcoholic reaction medium containing sulfide or polysulfide ion. The free mercaptans, salts, and disulfides are described. The compounds are useful to accelerate vulcanization of rubber and include members useful as pigments and intermediates.

---

This application is a continuation-in-part of application Ser. No. 451,607 filed Apr. 28, 1965.

This invention relates to new chemical compounds, more particularly to new sulfur-containing heterocyclic compounds, and to their use as accelerators for the vulcanization of rubber.

The new compounds are 1,2-dithiole-3-thione derivatives having the formula:

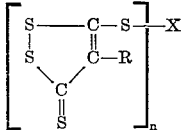

where (a) $n$ has the value 1 and X represents hydrogen or a radical having the formula:

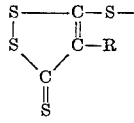

or (b) X represents a salt-forming atom or group and $n$ is an integer the value of which is determined by the valency of X; and where in each instance R represents hydrogen or a substituent atom or group.

Compounds where $n$ has the value 1 and X represents hydrogen are 5-mercapto-1,2-dithiole-3-thiones; those where X is a salt-forming atom or group are salts of the 5-mercapto-1,2-dithiole-3-thiones; and those where $n$ has the value 1 and X represents the radical:

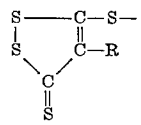

are the corresponding 5,5'-bis(3-thione-1,2-dithiolyl)disulfides.

Preferably R in the above formulae is an aliphatic or aromatic group.

In addition to their value as vulcanization accelerators, the compounds include members that are useful as pigments, and members that are useful as intermediates for the production of other new chemical compounds.

The invention includes a process for the production of a new compound of the invention in which sulfur is reacted with an olefinic compound having the formula:

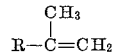

where R has the same significance as in the formula of the new 1,2-dithiole-3-thione derivatives above, or with a precursor capable of giving rise to such an olefinic compound under the reaction conditions, in the presence of an N-alkylated carboxylic amide.

Alternatively, a new compound can be produced by the reaction of sulfur with an olefinic compound having the formula

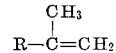

or with a precuros capable of giving rise to such a compound under the reaction conditions, in the presence of an amine and a polar organic solvent other than an N-alkyated carboxylic amide.

A further process for the production of a new compound comprises the reaction of a dithiole-3-thione having the formula:

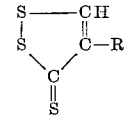

where R has the same significance as before, (a) with sulfur or hydrogen sulfide in the presence of an N-alkylated carboxylic amide, or (b) with sulfur or hydrogen sulfide in the presence of an amine and a polar organic solvent other than an N-alkylated carboxylic amide.

In each of the foregoing processes, the primary product is an amine salt of the 5-mercaptodithiole-3-thione, from which the free 5-mercaptodithiole-3-thione can be liberated by acidification. Under certain conditions the corresponding 5,5'-bis-(3-thione-1,2-dithiolyl) disulfide is formed as a by-product during the acidification.

N,n-dimethylforamide is a preferred example of an N-alkylated carboxylic amide, and tetrahydrothiopene dioxide is a preferred example of a different type of polar organic solvent suitable for use in the process under the conditions indicated above.

The invention also includes a process in which a new compound of the invention is employed as an accelerator in the vulcanization of rubber.

The processes for the production of the new 1,2-dithiole-3-thione derivatives of the above formula are particularly effective where R is an aromatic group. In such instances R is generally an aryl or substituted aryl group, especially a phenyl or substituted phenyl group, for example a tolyl, chlorophenyl, or alkoxyphenyl group.

Where R in the above formulae is an aliphatic group, this can be for example an alkyl group having either a straight or branched chain, for instance a methyl, ethyl, isopropyl, or neopentyl group, a cycloalkyl group, for instance a cyclohexyl group, or an aralkyl group, for instance a benzyl group. Where R is an alkyl group, the 5-mercapto-4-alkyl-1,2-dithiole-3-thiones that are most readily accessible are those where the alkyl group contains 3 or more carbon atoms, for instance from 3 to 21 carbon atoms, and where the chain is branched at the alpha or beta carbon atom, as for example in the neopentyl group.

Specific examples of 5-mercapto-1,2-dithiole-3-thiones are: 5 - mercapto-4-phenyl-1,2-dithiole-3-thione; 5 - mercapto-4(p-chlorophenyl)-1,2-dithiole-3-thione; 5-mercapto-4-mehyl-1,2-dithiole-3-thione; 5-mercapto-4-isopropyl-1,2-dithiole-3-thione; 5-mercapto-4-neopentyl-1,2-dithiole-3-thione; and 5-mercapto-4-benzyl-1,2-dithiole-3-thione.

Salts of the new 5-mercapto-1,2-dithiole-3-thiones include the metal salts, and the ammonium and the amine salts. Examples of the metal salts are those of the alkali metals, for example the sodium and potassium salts, and the copper, zinc, lead, chromium, and nickel salts.

Amine salts include those of, for example, alkylamines, dialkylamines, for instance dimethylamine and diethylamine, cycloalkylamines, for example cyclohexylamine, and the salts of piperidine and morpholine.

Specific examples of new 5,5'-bis(3-thione-1,2-dithiolthiole-3-thiones are the sodium, copper, zinc, nickel, lead, dimethylamine, cyclohexylamine, and morpholine salts of 5-mercapto-4-methyl-1,2-dithiole-3-thione, 5-mercapto-4-neopentyl-1,2-dithiole-3-thione, 5-mercapto-4-phenyl-1,2-dithiole-3-thione, and of 5-mercapto-4-(p-ethoxyphenyl)-1,2-dithiole-3-thione.

Specific examples of new 5,5'-bis(3-thione-1,2-ditholyl) disulfides are 5,5'-bis(4-phenyl-3-thione-1,2-dithiolyl) disulfide, 5,5'-bis(4-neopentyl-3-thione-1,2-dithiolyl) disulfide, and 5,5'-bis(4-cyclohexyl-3-thione-1,2-dithiolyl) disulfide.

Representative examples of starting materials having the formula:

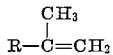

for use in the processes of the invention employing such a compound are alpha-methylstyrene and various nuclear-substituted alpha-methylstyrenes, for example 4-chloro-alpha-methylstyrene and 3-methyl-alpha-methylstyrene (giving 5-mercapto-4-phenyl-1,2-dithiole-3-thione or one of its derivatives); isobutylene (giving 5-mercapto-4-methyl-1,2-dithiole-3-thione or one of its derivatives); 2,3-dimethylbutene-1; diisobutylene (2,4,4-trimethylpentene-1); 2,4,4,6,6-pentamethylheptene-1; 2-cyclohexylpropene-1; and 2-benzylpropene-1.

Compounds that can be used as starting materials and which are precursors of the olefinic compounds of the above formula include for instance materials that can dehydrate or dehydrohalogenate in the required manner. For example, tert-butanol can be used in place of isobutylene in the production of 5-mercapto-4-methyl-1,2-dithiole-3-thione, and 2-phenylpropan-2-ol in place of alpha-methylstyrene in the production of 5-mercapto-4-phenyl-1,2-dithiole-3-thione.

In the processes of the invention which comprise the thiation of a 1,2-dithiole-3-thione, this may be one that has been produced by the addition of sulfur under conventional conditions to an appropriate olefinic compound. Examples of 1,2-dithiole-3-thiones that can be used include the following 4-substituted-1,2-dithiole-3-thiones; 4-methyl-; 4-isopropyl-; 4-neopentyl-; 4-phenyl-; 4-o-tolyl-; and 4-benzyl-.

Where a reaction is carried out in the presence of an N-alkylated carboxylic amide, the amine component of the primary product (an amine salt of a 5-mercapto-1,2-dithiole-3-thione) is believed to arise by partial decomposition of the amide under the reaction conditions. Examples of N-alkylated carboxylic amides that can be used are N,N-dimethylformamide and N,N-dimethylacetamide (which give rise to the dimethylamine salt of the mercapto compound) and diethylformamide.

Where a polar organic solvent other than an N-alkylated carboxylic amide is employed, this can be, for example, the preferred material tetrahydrothiophen dioxide or dimethyl sulfoxide or methylpyrrolidone.

Amines that can be used in conjunction with a polar solvent other than an N-alkylated carboxylic amide are preferably aliphatic amines, for example alkylamines, dialkylamines, for instance dimethylamine and diethylamine, amines where the nitrogen atom is a member of a saturated ring, for example morpholine and piperidine, cycloalkylamines, for example cyclohexylamine, and aralkylamines, for example benzylamine. Other amines that can be used include N-alkylanilines, for example N-ethylaniline.

An amine, added as such to the reaction system, can also be present where the process is carried out in the presence of an N-alkylated carboxylic amide.

In all instances the recation mixture can, if desired, contain a proportion of a non-polar solvent, for example xylene.

The ratio of the reactants used in the process depends on the material that is reacted with the sulfur. Where the starting material is an olefinic compound of the formula:

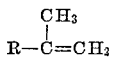

good results are obtained using 6 atomic proportions of sulfur per mole of the olefinic compound, that is to say the stoichiometric ratio of reactants. More or less than this proportion of sulfur can be used, however, for example from 3 to 7 or from 4 to 5 atomic proportions per mole of olefinic compound. Similar quantities are normally satisfactory where a precursor of the olefinic compound is employed.

In the thiation of a 1,2-dithiole-3-thione, the thiating agent can be either sulfur or hydrogen sulfide, but improved yields are obtained when both these materials are present. The sulfur can be used in amounts varying, for example, from 90% to 250% of the amount theoretically required for the thiation of the 1,2-dithiole-3-thione, while when hydrogen sulfide is employed, this is normally bubbled into the reaction mixture at a rate sufficient to maintain a substantially saturated solution.

In general, an elevated reaction temperature is required for a practical reaction rate, for example a temperature of at least 100° C., and preferably at least 125° C., for example from 140° to 220° C. or from 150° to 250° C. Where the boiling point of the organic polar solvent is suitable, the process is conveniently conducted by boiling under reflux. The course of the reaction can be followed by observing the rate at which hydrogen sulfide is produced, and the reaction can be terminated when the rate has fallen to a very low value or ceased. It will be appreciated that in certain circumstances it may be more economic to terminate the reaction somewhat short of completion. Reaction times of, for example, from 6 to 96 hours can be used, the optimum varying according to the particular reactants used.

A 5,5'-bis(3-thione-1,2-dithiolyl)disulfide is formed as a by-product, or in some instances as the major product, when an aqueous solution of a water-soluble salt of a 5-mercapto-1,2-dithiole-3-thione is acidified. This occurs when the solution also contains soluble sulfur or sulfides and is favored by operation with warm or hot solutions and by the use of an excess of acid.

Partial conversion of a 5-mercapto-1,2-dithiole-3-thione to the corresponding disulfide can also occur when the mercapto compound contains sulfur as an impurity and the impure material is heated in an organic solvent, for example toluene.

The preferred method for the production of the new 5,5'-bis(3-thione-1,2-dithiolyl) disulfides, however, comprises the oxidation of the corresponding mercapto compound, often preferably by the action of an oxidizing agent, for example, a persulfate, hypochlorite, hydrogen peroxide, or oxygen, on an aqueous solution of a water-soluble mercaptan salt.

The alkali metal salts of the 5-mercapto-1,2-dithiole-3-thiones can be obtained by treatment of the mercaptan or an amine salt of the mercaptan with, for example, an alkali metal hydroxide or carbonate. Amine salts can be obtained by direct interaction of the mercaptan and the amine.

Salts of other metals are generally water-insoluble, and a preferred method for their production comprises mixing an aqueous solution of a water-soluble mercaptan salt, for example an alkali metal or amine salt, with an aqueous solution of a water-soluble salt of the appropriate metal, thereby precipitating the water-insoluble mercaptan metal salt.

In the process for the vulcanization of rubber, the preferred new 1,2-dithiole-3-thione derivatives are those of the above formula where R is an aromatic or aliphatic group. When aromatic, R is generally an aryl or substituted aryl group; when aliphatic, R can be for example an alkyl group having either a straight or branched chain, preferably one having 3 or more carbon atoms and branched at the alpha or beta carbon atom, a cycloalkyl group, or an aralkyl group.

The salts of the mercapto-1,2-dithiole-3-thiones and the bis(3-thione-1,2-dithiolyl) disulfides are particularly effective vulcanization accelerators. The salts include the metal salts, the ammonium and the amine salts. Examples of the metal salts that are especially useful as vulcanization accelerators are those of zinc, lead, and nickel. Amine salts that show accelerator activity include those of, for example alkylamines, dialkylamines, for instance dimethylamine and diethylamine, cycloalkylamines, for example cyclohexylamine, and the salts of piperidine and morpholine.

Specific examples of such metal and amine salts are the zinc, nickel, lead, dimethylamine, cyclohexylamine, and morpholine salts of 5-mercapto-4-neopentyl-1,2-dithiole-3-thione, 5-mercapto-4-phenyl-1,2-dithiole-3-thione, and of 5-mercapto-4-(p-ethoxyphenyl) - 1,2 - dithiole-3-thione.

Examples of useful 5,5'-bis(3-thione-1,2-dithiolyl) disulfides are 5,5'-bis(4-phenyl-3-thione-1,2-dithiolyl) disulfide, 5,5'-bis(4-neopentyl-3-thione-1,2-dithiolyl) disulfide, and 5,5'-bis(4-cyclohexyl-3-thione-dithiolyl) disulfide.

The new compounds can be used as accelerators in the vulcanization of natural and synthetic rubbers. Synthetic rubbers that can be vulcanized include the sulfur-vulcanizable elastomers, for example polymers of 1,3-butadienes, for instance of 1,3-butadiene itself and of isoprene, copolymers of 1,3-butadienes with other monomers, such as styrene, acrylonitrile, isobutylene, or methyl methacrylate, polyolefin rubbers, for instance ethylene-propylene terpolymers and polymers of chloroprene.

In the vulcanization process, the accelerators are usually used in conjunction with sulfur or other vulcanizing agent, for example an amine disulfide, thiuram sulfide, or metal oxide, and with other commonly used ingredients, for example zinc oxide, stearic acid, a filler, and an antioxidant.

The additives can be incorporated into unvulcanized rubber by conventional means, using for example an internal mixer or a roll mill, or by adding a solution or suspension to a rubber latex, giving a mixture which is subsequently vulcanized at an elevated temperature. This temperature is one that is appropriate to the particular rubber concerned, for example a temperature in the range 135°–155° C. where the composition is based on natural rubber, or a temperature in the range of 140°–160° C. where the composition is based on a styrene-butadiene rubber.

The amount of accelerator used depends on a number of factors, including for example the type of rubber and the use for which the vulcanized product is required. The amount is, however, usually within the range 0.3 to 5 parts by weight per 100 parts by weight of rubber, for example 0.5, 1.0, or 1.5 parts by weight.

Conventional amounts of the other additives referred to above can be used.

The invention is illustrated by the following examples.

EXAMPLE 1

This example describes the production of the dimethylamine salt of 5-mercapto-4-phenyl-1,2-dithiole-3-thione and of the free mercapto compound.

A solution of 104 cc. (0.8 mole) of alpha- methylstyrene and 122 grams (3.8 gram atoms) of sulfur in 800 cc. of dimethylformamide was stirred and boiled under reflux for 7 hours. The dimethylformamide was then distilled off under reduced pressure, 200 cc. of toluene were added to the residue, and the mixture was heated to boiling. After cooling, the mixture was filtered, and 59.8 grams of the crude dimethylamine salt of 5-mercapto-4-phenyl-1,2-dithiol-3-thione, a solid having a melting point of 186°–187° C., were collected by filtration. Recrystallization of a sample from water gave the product in the form of yellow needles having a melting point of 190° C. (Found: C, 45.8%; H, 4.7%; N, 5.4%; S, 44.1%. $C_{11}H_{13}NS_4$ requires C, 46.0%; H, 4.5%; N, 4.9%; S, 44.6%.)

The bulk of the crude dimethylamine salt was dissolved in water, leaving 6 grams of sulfur as an insoluble residue. After filtration, the solution was acidified thereby precipitating 5 - mercapto - 4 - phenyl-1,2-dithiole-3-thione. The material was obtained in the form of orange plates having a melting point of 150°–153° C. by recrystallization from toluene. (Found: C, 45.0%; H, 2.7%; S, 52.3%. $C_9H_6S_4$ requires C, 44.6%; H, 2.5%; S, 52.9%.)

A further 6.5 grams of 5-mercapto-4-phenyl-1,2-dithiole-3-thione were obtained by extracting the toluene filtrate from the operations described above with aqueous alkali and acidifying the alkaline extracts

EXAMPLE 2

5,5'-bis(4-phenyl-3-thione-1,2-dithiolyl) disulfide was precipitated as an orange powder having a melting point of 214°–217° C. by the addition of an aqueous solution of ammonium persulfate to an aqueous solution of the dimethylamine salt of 5-mercapto-4-phenyl-1,2-dithiole-3-thione.

Crystallization from butoxyethanol gave the product in the form of orange-red plates having a melting point of 224° C.

EXAMPLE 3

This example describes the production of a number of metallic salts of 5 - mercapto - 4-phenyl-1,2-dithiole-3-thione.

Addition of an aqueous solution of cupric chloride, zinc chloride, nickel sulfate, and lead nitrate to an aqueous solution of the dimethylamine salt of 5-mercapto-4-phenyl-1,2-dithiole-3-thione gave respectively the brown cupric salt, yellow zinc salt, brown nickel salt, and brick-red lead salt of 5-mercapto-4-phenyl-1,2-dithiole-3-thione.

After filtering, drying, and grinding, these metal salts were suitable for use as pigments.

EXAMPLE 4

This example describes the production of the dimethylamine salt of 5-mercapto-4-phenyl-1,2-dithiole-3-thione from alpha-methylstyrene and sulfur, using a higher ratio of sulfur and a longer reaction period than in the process described in Example 1.

A mixture of 156 cc. of alpha-methylstyrene and 220 grams of sulfur in 1200 cc. of dimethylformamide was stirred and boiled under reflux for 40 hours. The initial pot temperature was 148° C.; this rose to 155° C. during 32 hours and then remained constant.

The dimethylformamide was then removed by distillation of the reaction mixture at a pressure of 20 mm. of mercury up to a pot temperature of 130° C. To the hot residue was added gradually 250 cc. of toluene, whereupon almost immediate solidification occurred. After cooling, the yellow crystalline dimethylamine salt of 5-mercapto-1,2-dithiole-3-thione was separated by filtration, and washed with a small volume of toluene. The yield was 146.5 grams, a further 22 grams being obtained by concentration of the toluene mother liquors and washings. Recrystallization from water gave the product as yellow needles having a melting point of 190° C.

EXAMPLE 5

This example describes the production of the morpholine salt of 5-mercapto-4-phenyl-1,2-dithiole-3-thione.

To a solution of 10 cc. of morpholine in 200 cc. of water were added 12.5 grams of 5-mercapto-4-phenyl-1,2-dithiole-3-thione. A clear solution was obtained on heating to the boiling point, and on cooling, 12.2 grams of the morpholine salt of 5-mercapto-4-phenyl-1,2-dithiole-3-thione, a compound having a melting point of 188°–189° C., were obtained.

EXAMPLE 6

This example describes various procedures for the production of the dimethylamine salt of 5-mercapto-4-phenyl-1,2-dithiole-3-thione from 4-phenyl-1,2-dithiole-3-thione.

(a) A mixture of 6.3 grams of 4-phenyl-1,2-dithiole-3-thione and 1.0 gram of sulfur in 40 cc. of dimethylformamide was boiled under a reflux for 8 hours. The dimethylformamide was then distilled off under reduced pressure and the residue was treated with 25 cc. of hot benzene. The solid which separated on cooling was visibly a mixture; after filtering, it was boiled with 50 cc. of toluene, thereby dissolving out unchanged 4-phenyl-1,2-dithiole-3-thione and leaving undissolved 0.8 gram of the dimethylamine salt of 5-mercapto-4-phenyl-1,2-dithiole-3-thione. The latter was shown by melting point and infrared spectrum to be identical with the dimethylamine salt described in Example 1.

(b) A solution of 1 gram of 4-phenyl-1,2-dithiole-3-thione in 8 cc. of dimethylformamide was boiled under reflux for 8 hours, hydrogen sulfide gas being passed continuously into the reaction mixture. Isolation of the products in a manner similar to that described in (a) above gave 0.15 gram of the dimethylamine salt of 5-mercapto-4-phenyl-1,2-dithiole-3-thione and 0.7 gram of unchanged 4-phenyl-1,2-dithiole-3-thione.

(c) A mixture of 1 gram of 4-phenyl-1,2-dithiole-3-thione and 0.2 gram of sulfur in 10 cc. of dimethylformamide was boiled under reflux for 8 hours, with passage of hydrogen sulfide gas into the reaction mixture. The dimethylamine salt of 5-mercapto-1,2-dithiole-3-thione, 0.75 gram, was isolated from the reaction products.

EXAMPLE 7

This example describes the thiation of 4-phenyl-1,2-dithiole-3-thione, the procedure employed for the isolation of the reaction products being such that the major component isolated was 5,5'-bis(4-phenyl-3-thione-1,2-dithiolyl) disulfide.

A mixture of 1 gram of 4-phenyl-1,2-dithiole-3-thione and 0.3 gram of sulfur in 10 cc. of tetrahydrothiophene dioxide was stirred and heated at 200°–210° C. for 5 hours while hydrogen sulfide and dimethylamine vapor were passed into the reaction mixture. After cooling water was added and the mixture was extracted with ether. After separation of the ether extract, the aqueous layer was acidified, thereby precipitating an oil which rapidly solidified to an orange-red solid. This was digested with 10 cc. of boiling toluene to give, as an insoluble residue after cooling, 0.4 gram of 5,5'-bis(4-phenyl-3-thione-1,2-dithiolyl) disulfide. The compound was shown by melting point and infrared spectrum to be identical with that described in Example 2.

EXAMPLE 8

This example describes the production of the dimethylamine salt of 5-mercapto-4-neopentyl-1,2-dithiole-3-thione and the free mercapto compound from diisobutylene and sulfur.

A mixture of 150 grams of diisobutylene and 175 grams of sulfur in 960 cc. of dimethylformamide was boiled under reflux for 70 hours, during which time the temperature of the reaction mixture gradually increased from 129° to 157° C. The dimethylformamide was then distilled from the product at a pressure of 20 mm. of mercury up to a pot temperature of 140° C. To the residue were added 200 cc. of toluene, leaving the dimethylamine salt of 5-mercapto-4-neopentyl-1,2-dithiole-3-thione as a yellow crystalline residue. The weight of this material, after separation by filtration and washing with toluene, was 36 grams, and its melting point was 170°–171° C. The melting point was raised to 175°–176° C. by recrystallization from water.

By acidifying an aqueous solution of 20 grams of the recrystallized dimethylamine salt, keeping the temperature of the solution below 10° C., and avoiding an excess of acid, 16 grams of the free mercapto compound were precipitated. The initial product had a melting point of 57°–59° C.; this was raised to 60°–61° C. by crystallization from 40–60 petroleum ether.

EXAMPLE 9

5,5' - bis(4 - neopentyl-3-thione-1,2-dithiolyl) disulfide was obtained as a solid having a melting point of 138°–139° C. by the addition of a solution of potassium persulfate to an aqueous solution of the dimethylamine salt of 5-mercapto-4-neopentyl-1,2-dithiole-3-thione.

EXAMPLE 10

This example illustrates the use of 5-mercapto-4-phenyl-1,2-dithiole-3-thione, its dimethylammonium, nickel, zinc, and lead salts, and 5,5'-bis(4-phenyl-3-thione-1,2-dithiolyl) disulfide as accelerators in the vulcanization of rubber, and describes the methods employed to assess the effectiveness of each material.

A masterbatch of the following composition was prepared by compounding on a mill:

|  | Parts by weight |
| --- | --- |
| Pale crepe | 100 |
| Zinc oxide | 3 |
| Stearic acid | 1 |
| Sulfur | 2.5 |

Each test compound was then incorporated into a separate portion of the masterbatch at a level equivalent to 2 parts by weight per 100 parts by weight of the rubber. A further portion of the masterbatch was used as a control. Each mix was allowed to stand for 24 hours before being tested.

In one test method, a sample of the mix under test was placed in a Mooney plastometer fitted with a "large" rotor, according to British Standard Specification No. 1673, Part 3, 1951. The time taken for the reading of the instrument to increase to 100 units at a temperature of 140°±1° C. was recorded, this time being inversely related to the accelerator activity of the compound under test.

In a second test method, the degree of vulcanization of a mix after various cure times at 160° C. was determined by measuring the extent to which a cured sample swelled on immersion in benzene for 24 hours at room temperature, the extent of swelling being inversely proportional to the degree of vulcanization. The procedure was that of British Standard Specification 903, Part A16, method C, using strips cured in 1 mm. x ½ inch x 4 inch moulds.

The results given in the following table show the marked accelerator activities of the test compounds.

| Accelerator | Mooney plastometer time to reach 100 units (min.) | Percent linear swelling in benzene—cure time (min.) | | |
|---|---|---|---|---|
| | | 7.5 | 15 | 30 |
| 5-mercapto-4-phenyl-1,2-dithiole-3-thione (Compound A) | 7½ | 85 | 85 | 85 |
| Dimethylammonium salt of A | 7 | 75 | 75 | 70 |
| Nickel salt of A | 6½ | 67 | 64 | 69 |
| Zinc salt of A | 35 | 97 | 90 | 84 |
| Lead salt of A | 18½ | 73 | 70 | 73 |
| 5,5'-bis(4-phenyl-3-thione-1,2-dithiolyl) disulfide | 7¼ | 80 | 70 | 79 |
| None (control) | 120 | 150 | 120 | 110 |

EXAMPLE 11

This example describes the thiation of 4-phenyl-1,2-dithiole-3-thione using tetrahydrothiophene dioxide as a solvent and the processing of the reaction mixture such that the products isolated included the dimethylamine salt of 5-mercapto-4-phenyl-1,2-dithiole-3-thione.

A mixture of 2 grams of 4-phenyl-1,2-dithiole-3-thione and 0.65 gram of sulfur in 10 cc. of tetrahydrothiophene dioxide was stirred and heated at 190°–200° C. for 6½ hours while separate streams of dimethylamine vapor and hydrogen sulfide were passed in. After cooling, 30 cc. of toluene were added and the mixture was twice extracted with 20 cc. of water. The aqueous extracts were combined and evaporated, first on a steam bath, and then at a temperature of 150° C. under a pressure of 0.5 mm. of mercury to remove the tetrahydrothiophene dioxide.

To the residue were added 10 cc. of toluene, leaving as an insoluble residue 1.3 grams of the dimethylamine salt of 5-mercapto-4-phenyl-1,2-dithiole-3-thione in a slightly impure form having a melting point of 172°–173° C. By boiling with 15 cc. of water, this material was separated into 0.3 gram of 5,5'-bis(4-phenyl-3-thione-1,2-dithiolyl)disulfide, which remained as an insoluble residue, and 0.6 gram of the dimethylamine salt of 5-mercapto-4-phenyl-1,2-dithiole-3-thione, melting point 188°–190° C., which crystallized from the water solution on cooling.

An alternative process for the preparation of 5-mercapto-1,2-dithiole-3-thiones and their salts comprises heating a 1,2-dithiole-3-thione having the formula:

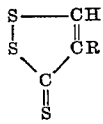

in which R represents a hydrogen atom or an aliphatic or an aromatic group as previously described in a alkaline alcoholic medium containing sulfide or polysulfide ions. The initial product is again a salt of the 5-mercapto-1,2-dithiole-3-thione from which the free mercapto can be obtained by acidification.

The preferred source of sulfide or polysulfide ions is an alkali metal sulfide or polysulfide, but alternatively the sulfide or polysulfide ions can be present in association with alkaline earth metal or ammonium ions. The sulfide or polysulfide ions may be introduced into the reaction mixture as a solution of, for example, alkali metal sulfide or polysulfide, or they may be generated in situ by the action of an alkali metal hydroxide on a suitable sulfur-containing precursor. The latter may be, for instance, sulfur, hydrogen sulfide, or a part of the dithiolethione that undergoes thiation in the process of the invention. In whatever manner the sulfur is introduced into the reaction mixture, the amount available for thiation can be from 90% to 250% of the amount theoretically required to thiate the 1,2-dithiole-3-thione.

Where the sulfide or polysulfide ions are present in association with an alkali metal, the latter is usually sodium, although, for example, lithium and potassium sulfide and polysulfides are functionally satisfactory. Examples of other suitable sulfides and polysulfides are those of magnesium, calcium, barium, ammonium, and diethylammonium.

Suitable alcohols for use in forming the alcoholic reaction medium are those having from 1 to 6 carbon atoms per molecule such as, for example, methyl alcohol, ethyl alcohol, isopropyl alcohol, n-butyl alcohol, t-butyl alcohol, amyl alcohol, and hexanol. The preferred alcohols are those having from 2 to 4 carbon atoms per molecule. The reaction medium preferably contains a certain amount of water. Normally, the volume of water present should not exceed that of the alcohol, and the proportions of alcohol to water used in practice are usually from 20:1 to 1.5:1 on a volume basis.

The temperature at which the reaction proceeds is generally between 35° C. and 150° C. but the reaction is most conveniently carried out at or about the boiling point of the reaction medium, for example, from 40° C. to 140° C. and preferably between 60° C. and 120° C.

EXAMPLE 12

This example describes the production of 5-mercapto-4-phenyl-1,2-dithiole-3-thione and its dimethyl ammonium salt.

A mixture of 4.2 grams of 4-phenyl-1,2-dithiole-3-thione, 15 cc. of ethyl alcohol, and 8 cc. of a solution of "sodium disulfide" made by dissolving the theoretical quantity of sulfur in warm aqueous sodium sulfide solution was boiled for 3 hours. The ethyl alcohol was distilled off and 200 cc. of ether and 25 cc. of water were added. The aqueous layer was acidified to yield 3.2 grams of 5-mercapto-4-phenyl-1,2-dithiole-3-thione which had a melting point of 115° C. to 120° C. The product was treated with concentrated aqueous dimethylamine to give 2.65 grams of the crystalline dimethylammonium salt which had a melting point of 190° C. to 191° C.

EXAMPLE 13

This example describes the production of 5-mercapto-4-phenyl-1,2-dithiole-3-thione, the sulfur for the thiation being supplied by partial decomposition of the initial thione.

A mixture of 1.0 gram of 4-phenyl-1,2-dithiole-3-thione, 4 grams of 50% by weight aqueous potassium hydroxide, and 16 cc. of n-butyl alcohol were heated at 100° C. for 3 hours. The n-butyl alcohol was removed under reduced pressure and 70 cc. of water were added to the residue. The liquors were acidified to pH 8 and ether extracted. Acidification of the aqueous layer, in the presence of ether to remove tarry material, gave 0.44 gram of substantially pure 5-mercapto-4-phenyl-1,2-dithiole-3-thione which had a melting point of 152° C. to 153° C.

EXAMPLE 14

This example illustrates the use of 5-mercapto-4-phenyl-1,2-dithiole-3-thione and 5,5'-dithiobis(4-phenyl-1,2-dithiole-3-thione) as accelerators for the vulcanization of neoprene.

A masterbatch of the following composition was prepared by compounding on a mill:

| Masterbatch ingredients: | Parts by weight |
|---|---|
| Neoprene W | 100 |
| Semi-reinforcing furnace black | 60 |
| Naphthenic processing oil | 10 |
| Magnesium oxide vulcanizing agent | 4 |
| Stearic acid | 0.5 |
| Phenyl beta naphthylamine | 2.0 |

Each test compound was then incorporated into a separate portion of the masterbatch together with zinc oxide vulcanizing agent:

| Stock | 1 | 2 |
|---|---|---|
| Parts by weight | | |
| Zinc oxide | 5 | 5 |
| 5,5'-dithiobis(4-phenyl-1,2-dithiole-3-thione) | 0.5 | |
| 5-mercapto-4-phenyl-1,2-dithiole-3-thione | | 0.5 |

Mooney scorch times at 121° C. were determined by means of a Mooney plastometer. The time in minutes for the Mooney reading to rise 5 points above the minimum reading was recorded.

| Stock: | Mooney scorch at 121° C. |
|---|---|
| 1 | 33.2 |
| 2 | 31.5 |

A similar stock containing 0.5 part of a widely used commercial accelerator gave a scorch time of 8.1 minutes.

The stocks were curved by heating in a press for 30 to 40 minutes at 153° C. and the stress-strain properties determined in the usual manner.

| Stock | 1 | 2 |
|---|---|---|
| Modulus of elasticity in lbs./in.² at elongation of: | | |
| 200% | 1,730 | 1,740 |
| 300% | 2,830 | 2,780 |
| Ultimate tensile strength, lbs./in.² | 2,900 | 2,900 |
| Ultimate elongation, percent | 320 | 320 |

It is intended to cover all changes and modifications of the examples of the invention herein chosen for purposes of disclosure which do not constitute departures from the spirit and scope of the invention.

What is claimed is:

1. The process of vulcanizing rubber which comprises heating natural rubber, synthetic sulfur vulcanizable diene hydrocarbon homopolymer rubber, sulfur vulcanizable copolymer rubber of a diene hydrocarbon and styrene, acrylonitrile, isobutylene or methylmethacrylate, sulfur vulcanizable ethylene propylene terpolymer rubber or polychloroprene rubber and vulcanizing agent in the presence of an accelerating amount of a compound having the formula:

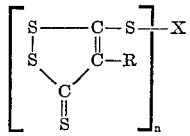

where $n$ is an integer determined by the valency of X and X is hydrogen, a radical having the formula:

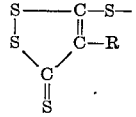

alkali metal, copper, zinc, lead, chormium, nickel, ammonium, lower alkyl ammonium, di(lower alkyl) ammonium, benzyl ammonium, N-(lower alkyl)phenylammonium, cycloalkylammonium, piperidinium or morpholinium and R is alkyl of not more than 21 carbon atoms, phenyl, lower alkylphenyl, lower alkoxyphenyl, chlorophenyl, benzyl, cyclohexyl or hydrogen.

2. The process of claim 1 wherein the rubber is sulfur-vulcanizable hydrocarbon rubber and the vulcanizing agent is sulfur.

3. The process of claim 2 where X is metal and R and R is aryl.

4. The process of claim 2 where X is dialkylammonium and R is aryl.

5. The process of claim 2 where X is metal and R is alkyl.

6. The process of claim 5 where R contains 3 to 21 carbon atoms and is branched at the alpha or beta carbon.

7. The process of claim 2 where $n$ is one, X is hydrogen, and R is phenyl.

8. The process of claim 2 where $n$ is one, X is

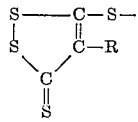

and R is phenyl.

9. The process of claim 1 where the rubber is neoprene and the vulcanizing agent is metal oxide.

10. The process of claim 9 where $n$ is one, X is hydrogen, and R is phenyl.

11. The process of claim 9 where $n$ is one, X is

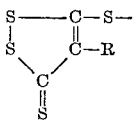

and R is phenyl.

References Cited

UNITED STATES PATENTS 3,109,772  11/1963  Carosino _____ 167—33

JOSEPH L. SCHOFER, Primary Examiner

C. A. HENDERSON, Jr., Assistant Examiner

U.S. Cl. X.R.

260—41.5, 327, 784, 792